(12) United States Patent
Jungreis

(10) Patent No.: US 6,304,006 B1
(45) Date of Patent: Oct. 16, 2001

(54) ENERGY MANAGEMENT UNINTERRUPTIBLE POWER SUPPLY SYSTEM

(75) Inventor: Aaron M. Jungreis, Cary, NC (US)

(73) Assignee: ABB T&D Technology Ltd., Zurich (CH)

(*) Notice: Subject to any disclaimer, the term of this patent is extended or adjusted under 35 U.S.C. 154(b) by 0 days.

(21) Appl. No.: 09/750,506

(22) Filed: Dec. 28, 2000

(51) Int. Cl.$^7$ ........................................ H02J 7/00
(52) U.S. Cl. ........................................ 307/64
(58) Field of Search ........................ 307/43, 44, 45, 307/47, 64, 67, 68

(56) References Cited

U.S. PATENT DOCUMENTS

| | | | |
|---|---|---|---|
| 1,748,097 | 2/1930 | Allen . | |
| 3,665,495 | 5/1972 | Carter et al. | 307/67 |
| 4,019,115 | 4/1977 | Lips | 321/27 |
| 4,465,943 | 8/1984 | Risberg | 307/67 |
| 5,198,971 | 3/1993 | Recker et al. | 363/71 |
| 5,237,494 | 8/1993 | Baader et al. | 363/141 |
| 5,285,029 | 2/1994 | Araki | 187/114 |
| 5,309,073 | 5/1994 | Kaneko et al. | 318/500 |
| 5,384,792 | 1/1995 | Hirachi | 371/66 |
| 5,449,993 | 9/1995 | Davis | 318/701 |
| 5,610,452 | 3/1997 | Shimer et al. | 307/89 |
| 5,612,581 | 3/1997 | Kageyama | 307/64 |
| 5,646,458 | 7/1997 | Bowyer et al. | 307/67 |
| 5,694,307 | 12/1997 | Murugan | 363/37 |
| 5,745,356 | 4/1998 | Tassitino, Jr. et al. | 363/71 |
| 5,745,670 | 4/1998 | Linde | 395/182.2 |
| 5,767,591 | 6/1998 | Pinkerton | 307/64 |
| 5,901,053 | 5/1999 | Eriksson et al. | 363/35 |
| 5,939,798 | 8/1999 | Miller | 307/64 |
| 5,994,794 | 11/1999 | Wehrlen | 307/66 |
| 5,994,795 | 11/1999 | Gabillet | 307/66 |

OTHER PUBLICATIONS

US. application No. 09/363,530, Jungreis, filed Jul. 29, 1999.

*Primary Examiner*—Edward H. Tso
(74) *Attorney, Agent, or Firm*—Woodcock Washburn Kurtz Mackiewicz & Norris LLP

(57) ABSTRACT

A power system is provided in which a grid supplies electrical power to a load and in which backup power is provided from one of a generator and a dc storage device. The power system includes a standalone inverter having an input and an output. The output of the standalone inverter is connected to the load. The power system includes a grid parallel inverter having an input and an output. The output of the grid parallel inverter is connected to the grid. A dc bus is electrically connected to the input of the standalone inverter and to the input of the grid parallel inverter.

35 Claims, 3 Drawing Sheets

ENERGY MANAGEMENT UNINTERRUPTIBLE POWER SUPPLY SYSTEM

FIELD OF THE INVENTION

The present invention generally relates to the field of power transmission and distribution systems. More particularly, the present invention relates to utilizing uninterruptible power supplies and a generator in a power system with a critical load.

BACKGROUND OF THE INVENTION

FIG. 1 is a one-line diagram of a typical arrangement of a main ac supply (e.g., power grid) 10, an on-line Uninterruptible Power Supply (UPS) 12, a load 14, and a battery bank 16. The on-line UPS typically contains a controlled rectifier DR1, a dc-to-ac inverter A1, a static bypass switch S1, and isolation transformers T1 and T2 (T2 is typically a nine-winding transformer, with a three-phase primary for S1, a three-phase primary for A1 and a three-phase secondary for the load, T2 is typically a three-winding transformer for single phase). The dc bus 12-1 is designed specifically to support the bank of batteries 16. The bus can provide charging current and also draw current from the batteries in the event of a power outage on the main ac supply 10. A UPS usually contains a static (electronic) bypass switch S1 so that the output of inverter A1 can be switched to the main supply 10 in the event of a fault or high inrush load.

FIG. 2 depicts an example of a conventional system employing an auxiliary generator 18 in combination with a UPS 12. Battery supplied UPSs provide backup power for short periods of time, typically on the order of minutes. The backup time can be substantially increased by adding a generator to the system. This is typically accomplished using an automatic transfer switch S2, at the input of the UPS 12, as shown in FIG. 2. When the main ac power supply 10 fails, the batteries 16 supply power to the UPS. If the power remains down for a predetermined period of time, the automatic transfer switch S2 will start the auxiliary generator 18 and switch the UPS 12 input to the auxiliary generator output through S2.

The use of an auxiliary generator in this manner has some drawbacks. Typically the auxiliary generator remains idle most of the time. Further, when an auxiliary generator is connected to and supplying power to a load (e.g., load 14), the auxiliary generator may not be operating at an efficient power output level. Many times it would be desirable to increase the power output level, allowing the auxiliary generator to supply power to both the load and the grid. However, the solution shown in FIG. 2 does not allow the auxiliary generator to feed power back into the grid.

FIG. 3 depicts an example of a conventional system employing an auxiliary generator 18 in combination with a UPS 12 and with the ability to supply power from the auxiliary generator 18 back into the grid through synchronizing equipment 19. FIG. 3 contains elements similar to those described above with respect to FIG. 2, and their description is omitted for brevity. The system of FIG. 3 includes a feedback switch S3 connected to the auxiliary generator 18. The feedback switch S3 is connected to synchronizing equipment 19, which is connected to the grid.

When the auxiliary generator is connected to the grid, this is referred to as grid parallel mode. The economics of operating the auxiliary generator in grid parallel mode are determined by a number of factors including the real-time price of fuel and electricity, as well as any arrangements the user has with the utility for peak shaving. The synchronizing equipment 19 allows the auxiliary generator to operate in grid parallel mode and may prevent backfeed of power in the event of a grid failure. However, the synchronizing equipment 19 can be expensive.

In view of the above problems, there is a recognized need for an energy management system that can supply backup power from a generator or from a dc storage device and also output that power back into the grid, without requiring synchronization or costly backfeed prevention equipment.

SUMMARY OF THE PRESENT INVENTION

A power system is provided in which a grid supplies electrical power to a load and in which backup power is provided from one of a generator and a dc storage device. The power system includes a standalone inverter. The output of the standalone inverter is connected to the load. The power system includes a grid parallel inverter. The output of the grid parallel inverter is connected to the grid. A dc bus is electrically connected to the input of the standalone inverter and to the input of the grid parallel inverter.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

Figure 1:
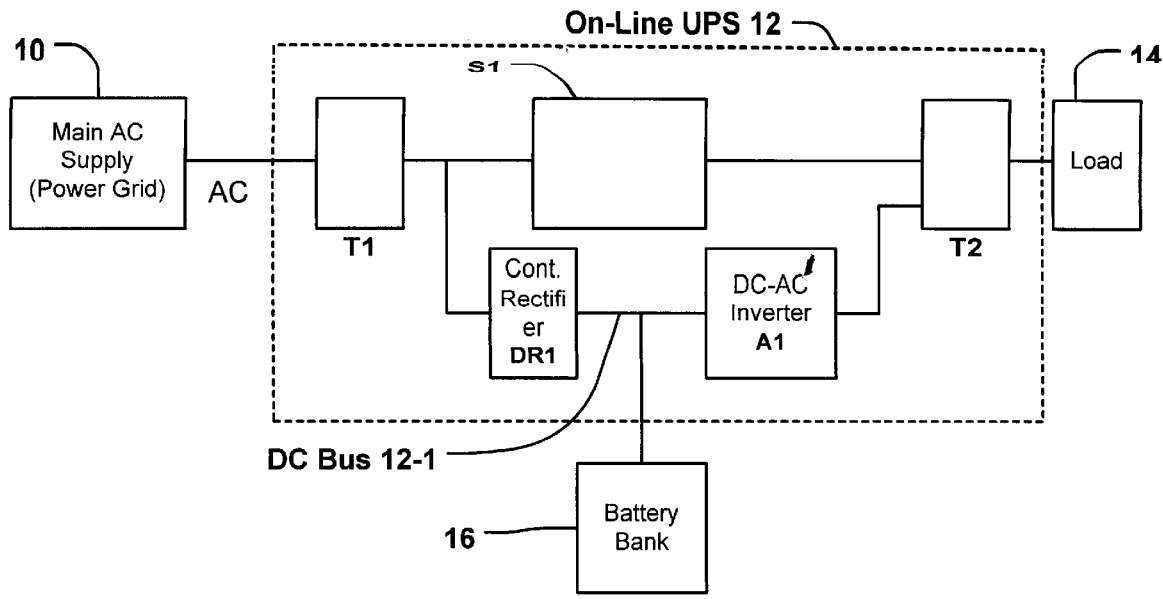
FIG. 1 is a one-line diagram of a prior art on-line uninterruptible power supply system.
Figure 2:
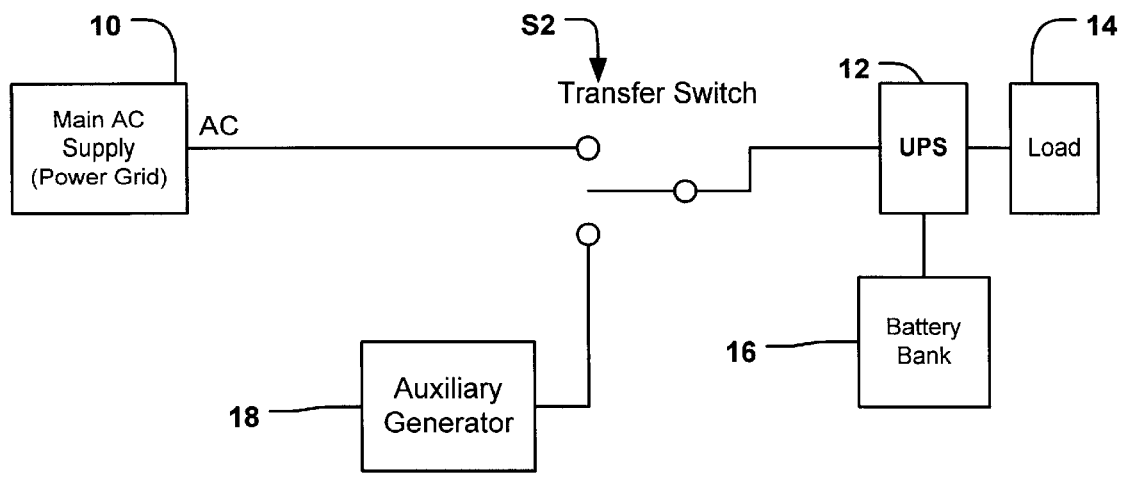
FIG. 2 is a one-line diagram of a prior art on-line uninterruptible power supply system with backup generator and automatic transfer switch.
Figure 3:
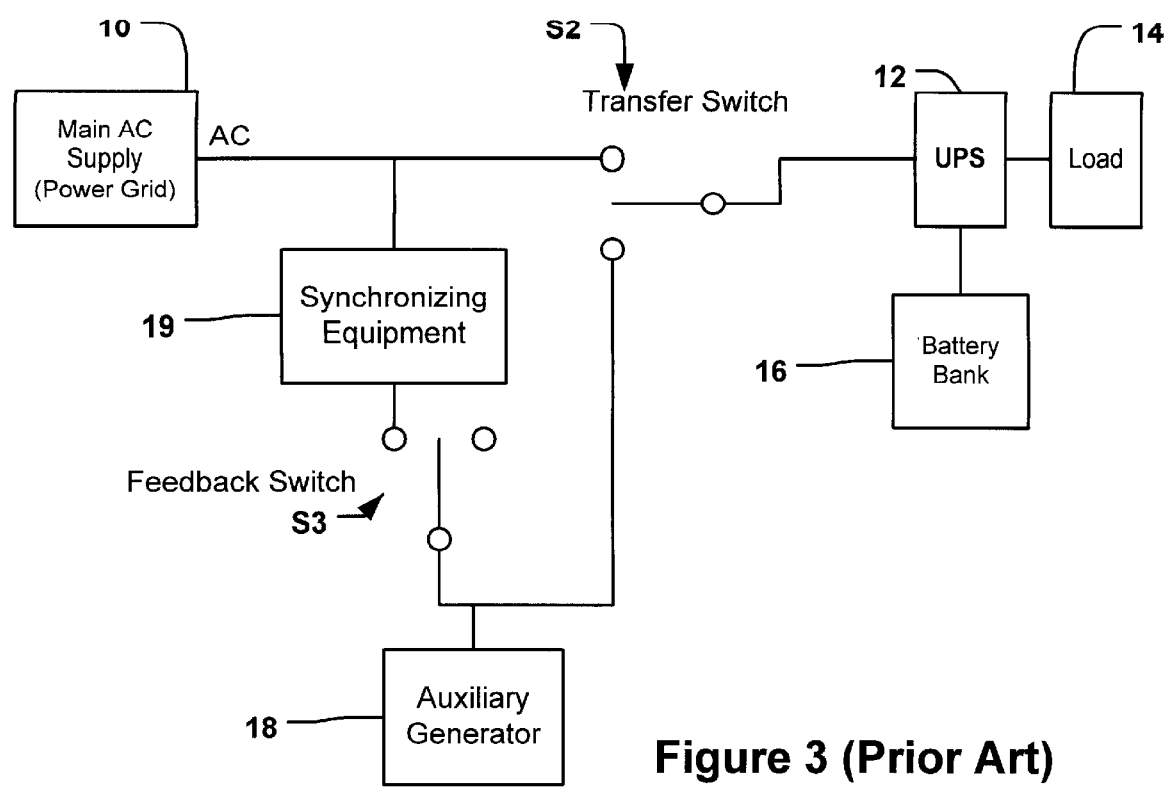
FIG. 3 is a one-line diagram of a prior art on-line uninterruptible power supply system with backup generator, automatic transfer switch, and synchronizing equipment.
Figure 4:
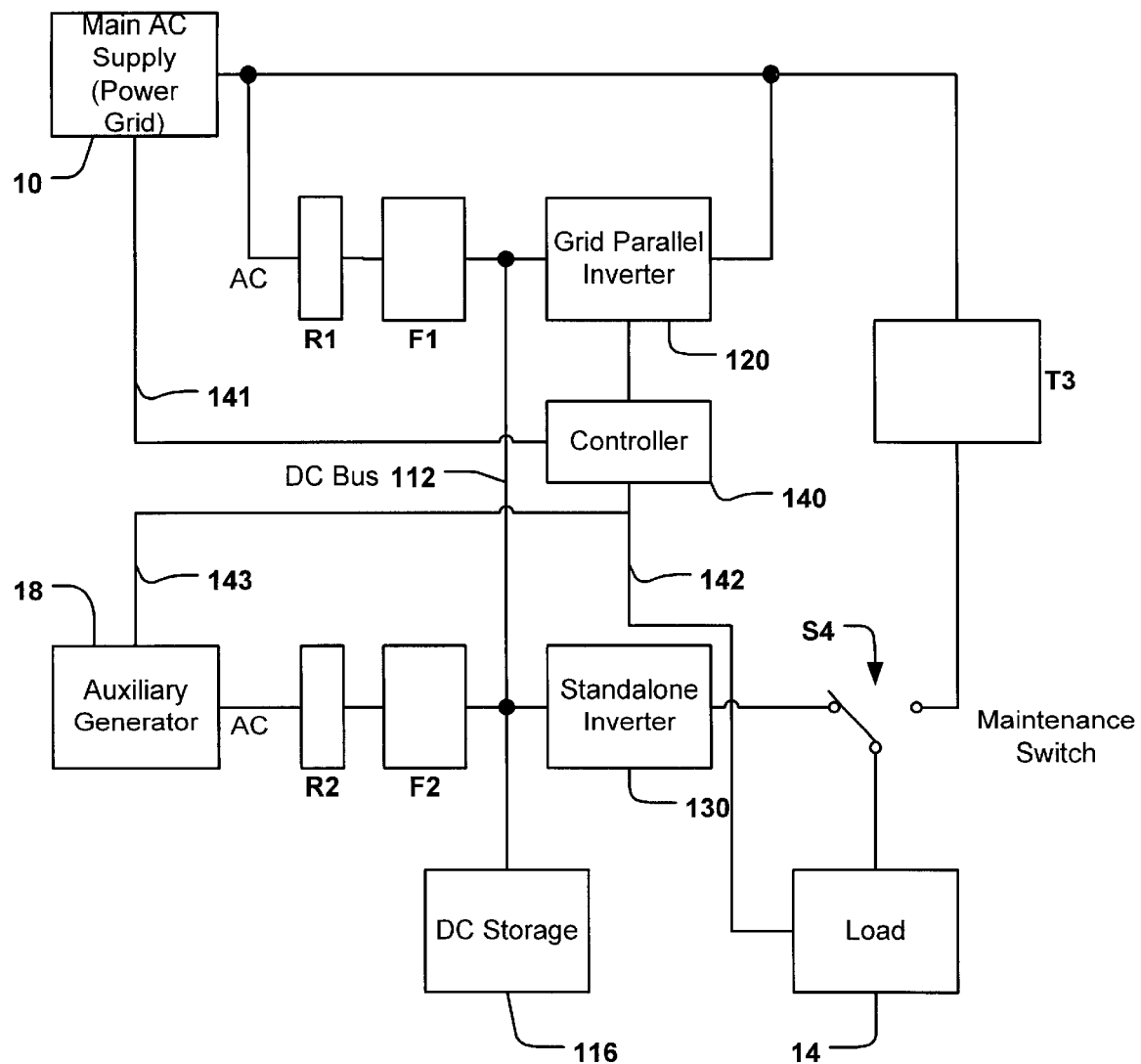
FIG. 4 is one-line diagram of an embodiment of an energy management uninterruptible power supply system in accordance with the present invention.

FIG. 4 is a one-line diagram of an embodiment of an energy management uninterruptible power supply system in accordance with the present invention. As shown in FIG. 4, an embodiment of the energy management uninterruptible power supply system includes an auxiliary generator 18, with an associated rectifier R2 and an associated filter F2, a dc storage device 116, a grid parallel inverter 120, a standalone inverter 130, and a dc bus The auxiliary generator 18 is appropriately electrically connected to the uncontrolled rectifier R2. The auxiliary generator 18 outputs ac power to the uncontrolled rectifier R2. The uncontrolled rectifier R2 rectifies the ac power and is appropriately electrically connected to the filter F2. Uncontrolled rectifier R2 prevents power from flowing backwards into the grid. It is therefore not possible for the generator 18, any power stored in the load 14, or any power in the dc bus 112 to feed any power to the grid through uncontrolled rectifier R2. The filter F2 filters the output of the uncontrolled rectifier into dc power and outputs the dc power onto the dc bus 112. Alternatively, the rectifier R2 may be a controlled rectifier.

The auxiliary generator 18 may provide power to the system after a grid failure. The auxiliary generator need only be started. No synchronizing is required because the generator 18 outputs power to a dc bus rather than to an ac power supply. In fact, the generator need not operate at the same frequency as the grid. Thus, the auxiliary generator can operate for example at 50 Hz, 60 Hz, 400 Hz, or even higher frequencies as would be the case for some microturbines. This system requires no mechanical or semiconductor switches for connecting the generator. The auxiliary generator may be any type of generator, and any number of generators may be connected to the system, as long as they are connected to the dc bus 112 through an uncontrolled rectifier and filter. Auxiliary generator 18 may be any suitable generator including a standalone generator or a microturbine. If the auxiliary generator is a microturbine, the microturbine is connected to the dc bus 112 through an inverter.

The main ac supply 10, also referred to as the grid, is appropriately electrically connected to the uncontrolled rectifier R1. The main ac supply 10 supplies ac power to uncontrolled rectifier R1. The uncontrolled rectifier R1 rectifies the ac power and is appropriately electrically connected to the filter F1. Uncontrolled rectifier R1 prevents power from flowing backwards into the grid. This prevents power in the dc bus, power from the generator, or power stored in the load from flowing back into the grid. It is therefore not possible for the generator 18, any power stored in the load 14, or any power in the dc bus 112 to feed any power to the grid through uncontrolled rectifier R1. Any power to the grid must go through the grid parallel inverter 120, described further below. The filter F1 filters the output of the uncontrolled rectifier R1 into dc power and outputs the dc power onto the dc bus 112. Alternatively, the rectifier R1 may be a controlled rectifier.

The dc storage device 116 is appropriately electrically connected to the dc bus 112 and may either supply power to the dc bus 112 or receive power from the dc bus 112. dc storage device 116 may be a battery bank, for example. If the dc storage device is a battery bank, the batteries may supply power to the dc bus 112 if the voltage of the dc bus becomes less than the voltage of the battery bank. The battery bank may receive power, or charge the battery bank, if the voltage of the dc bus 112 becomes greater than the voltage of the battery bank.

Alternatively, dc storage device 116 may be any type of appropriate dc storage device, for example, a flywheel, a capacitor, a solar cell, or a fuel cell. Preferably, the dc storage device 116 has a nearly constant dc output. However, if the dc storage device does not have a nearly constant dc output, the dc storage device may be appropriately connected to the dc bus through a dc to dc converter to provide a nearly constant dc output. The dc storage device may be another generator connected to the dc bus through a filter and rectifier.

Alternatively, several dc storage devices may be electrically connected to the dc bus 112. This may provide extra reliability, provide energy for transient loads, or provide additional flexibility in implementing and maintaining the system.

Grid parallel inverter 120 includes an input and an output. It inputs dc power and outputs ac power. The input of grid parallel inverter 120 is appropriately electrically connected to the dc bus 112. The output of grid parallel inverter 120 is appropriately electrically connected to the grid 10 and optionally to the transformer T3. Grid parallel inverter 120 may output ac power to the transformer T3 and may output ac power back into the grid 10. Since the grid parallel inverter is designed to turn off when the grid fails, there is no need to provide any reverse power flow circuitry or switches. A grid parallel inverter is typically used when a generator is feeding power back into the grid. The use of the dc bus also alleviates the need for synchronizing equipment which is normally necessary when operating a generator in grid parallel mode. For example, some types of generators, (e.g., micro-turbines and fuel cells) may use inverters to either drive a load or feed power back into the grid.

Standalone inverter 130 includes an input and an output, and inputs dc power and outputs ac power. The input of standalone inverter 130 is appropriately electrically connected to the dc bus 112. The output of standalone inverter 130 is appropriately electrically connected to the load 14. Standalone inverter 130 may output ac power to the load 14. A standalone mode inverter is typically used when a generator is driving a load. As further shown, standalone inverter 130 may be appropriately electrically connected to load 14 through maintenance switch S4.

The inverters must typically be designed to work as either a grid parallel mode inverter or a standalone mode inverter, but not both. Although an inverter can be designed to operate in both modes, utilities typically require the inverter to be designed for one mode or the other because it is considered too dangerous to allow the inverter to switch modes on its own. The danger comes from the possibility of electrifying the grid while it is down and being serviced.

A grid parallel mode inverter works as a current source. Its voltage follows the voltage of the grid and it sources current into the grid. Grid parallel mode inverters are typically designed to cease operation within a short period of time following a grid failure. This prevents the inverter from energizing the grid during the time when maintenance is likely.

A standalone mode inverter operates as a voltage source. It supplies a relatively constant voltage and does not have to cease operation upon a grid failure, as it is typically not connected to the grid.

Optional maintenance switch S4 includes a normal position and a maintenance position, and is appropriately electrically connected to standalone inverter 130, load 14, and transformer T3. In the normal position of the switch S4, the standalone inverter 130 is electrically connected to the load 14 through the switch S4, and the transformer T3 is electrically connected to neither the load 14 nor the standalone inverter 130. In the maintenance position of the switch S4, the transformer T3 is electrically connected to the load 14 through the switch S4, and the standalone inverter 130 is electrically connected to neither the load 14 nor the transformer T3. In this manner the standalone inverter 130 may be electrically isolated from ac power from the grid in preparation for maintenance.

Optionally, the transformer T3 is electrically connected to the grid and receives ac power from the grid. The transformer T3 transforms the power to the appropriate voltage for the load 14. The transformer T3 may be appropriately electrically connected to the maintenance switch S4, which in turn may be electrically connected to the load 14. In this manner, the load 14 can be electrically connected to ac power when maintenance is being performed on the standalone inverter.

In one operating condition, the generator 18 provides power to the dc bus 112. The dc bus voltage is high enough so that the diodes in the rectifier R1 are reverse biased and the dc bus 112 receives power only from the generator 18. The power from the generator 18 supplies power to the load 14 through standalone inverter 130 and supplies power to the grid 10 through grid parallel inverter 120. The amount of power being supplied to the grid can be controlled, or even turned off completely, to provide energy management of the system. For example, the grid parallel inverter 120 may be programmed to supply enough power into the grid 10 to keep the generator at full load capacity or some other capacity that maximizes efficiency.

The two inverters may be sized differently, allowing the generators to be sized for redundancy and robust transient response, and still allow them to be used at full capacity while driving a smaller load. Therefore, the grid parallel inverter may be sized larger than the standalone inverter, such that the grid parallel inverter can power the load and supply the excess capacity of the generator to the grid.

In another operating condition, the dc bus voltage drops and the system enters another operating condition. This operating condition may be entered upon, for example, the auxiliary generator failing. In this operating condition, the grid 10 provides power to the dc bus 112. The diodes in the rectifier R2 prevent power from flowing back into the generator 18. The standalone inverter 130 supplies power to the load 14.

In all operating conditions, if the grid fails, the grid parallel inverter immediately stops feeding power into the grid. This prevents the possibility of electrifying a grid which is off.

Optionally, a controller 140 is included to control the power through the grid parallel inverter. The controller 140 may be included in the grid parallel inverter 120 or may be separate from the grid parallel inverter 120. The controller 140 may include software to control the power through the grid parallel inverter 120.

The controller 140 may start the generator 18 upon failure of the grid or upon a peak shaving signal from a utility. The peak shaving signal may come from a data link 141 to the utility. The controller may include a connection 143 to the generator to start the generator 18.

The controller 140 may control the power output through the grid parallel inverter 120 to approximately equal the generator 18 capacity minus the maximum load of load 14. The controller 140 may control the power output through the grid parallel inverter 120 to approximately equal the generator 18 capacity minus the actual load of load 14. The controller 140 may include a connection 142 to the load 14 to monitor the actual load. The connection 142 may be a data link to a power meter, or an analog signal to a power meter.

The controller 140 may control the power output through the grid parallel inverter 120 to se t the power fed back to the utility to be approximately zero. The controller may include a connection 141 to the utility to monitor the internal power consumption of the user's site.

The controller 140 may control the power output through the grid parallel inverter 120 to perform peak shaving. The controller may include a connection 141 to receive a peak shaving signal from the utility.

The controller 140 may control the power output through the grid parallel inverter 120 to correct for power factor. The controller 140 may include a connection (not shown) to loads internal to the user's site to monitor power factor. The controller 140 can also be programmed to correct the user's overall power factor, even when a poor power factor is due to a distorted (as opposed to a phase-displaced) current waveform.

The controller 140 may allow the utility to control the power output through the grid parallel inverter 120. The controller 140 may include a connection 141 to the utility to receive commands to control the power through the grid parallel inverter 120.

The present invention does require more kilovolt/amps of inverter because two inverters are used, whereas one inverter would be used in a conventional system with synchronizing switches. However, the savings by not requiring the synchronizing switches will often be greater than the cost of the larger inverters. The standalone inverter may be sized for the size of the load. The grid parallel inverter may be sized for the capacity of the generator. Additionally, the present invention allows complete control of power being fed back into the grid through the grid parallel inverter. Further, the generator does not require the extra equipment required to operate in parallel with the grid (i.e., synchronization equipment).

Thus the present invention provides an energy management system that can supply backup power from a generator or from a dc storage device and also output that power back into the grid, without requiring synchronization or costly backfeed prevention switches.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular structures, methods, materials, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A power system in which a grid supplies electrical power to a load and in which backup power is provided from one of a generator and a dc storage device comprising:

a standalone inverter, having an input and an output, the output connected to the load;

a grid parallel inverter, having an input and an output, the output connected to the grid; and a dc bus electrically connected to the input of the standalone inverter and to the input of the grid parallel inverter.

2. The power system of claim 1 wherein the generator is connected to the dc bus through a filter in combination with a rectifier.

3. The power system of claim 2 wherein the rectifier is an uncontrolled rectifier.

4. The power system of claim 2 wherein the rectifier is a controlled rectifier.

5. The power system of claim 1 wherein the generator is a microturbine and is connected to the dc bus through an inverter.

6. The power system of claim 1 wherein the dc storage device is connected to the dc bus.

7. The power system of claim 1 wherein the grid is connected to the dc bus through a filter in combination with a rectifier.

8. The power system of claim 7 wherein the rectifier is an uncontrolled rectifier.

9. The power system of claim 7 wherein the rectifier is a controlled rectifier.

10. The power system of claim 1 wherein the grid is connected to the output of the grid parallel inverter.

11. The power system of claim 1 wherein the dc storage device is a battery bank.

12. The power system of claim 1 wherein the dc storage device comprises a member of a group consisting of batteries, flywheel, capacitors, solar cells, and fuel cells.

13. The power system of claim 1 wherein the dc storage device is a generator connected to the dc bus through a filter in combination with a rectifier.

14. The power system of claim 1 further comprising a maintenance switch electrically connected between the load and the dc storage device.

15. The power system of claim 14 further comprising a transformer electrically connected between the grid and the maintenance switch.

16. The power system of claim 1 wherein the standalone inverter is sized differently than the grid parallel inverter.

17. The power system of claim 1 further comprising a controller to control the power through the grid parallel inverter.

18. The power system of claim 17 wherein the grid parallel inverter comprises the controller.

19. The power system of claim 17 wherein the controller starts the generator upon failure of the grid or upon a peak shaving signal from a utility.

20. The power system of claim 19 wherein the controller is connected to a utility to receive the peak shaving signal.

21. The power system of claim 17 wherein the controller is connected to the generator to start the generator.

22. The power system of claim 17 wherein the controller controls the power output through the grid parallel inverter to approximately equal the generator capacity minus the maximum load of the load.

23. The power system of claim 17 wherein the controller controls the power output through the grid parallel inverter to approximately equal the generator capacity minus the actual load of the load.

24. The power system of claim 23 wherein the controller is connected to the load to monitor the actual load of the load.

25. The power system of claim 17 wherein the controller controls the power output through the grid parallel inverter to set the power fed back to the utility to be approximately zero.

26. The power system of claim 17 wherein the controller controls the power output through the grid parallel inverter to perform peak shaving.

27. The power system of claim 17 wherein the controller is connected to a utility to receive a peak shaving signal from the utility.

28. The power system of claim 17 wherein the controller controls the power output through the grid parallel inverter to correct for power factor.

29. The power system of claim 17 wherein the controller controls the power output through the grid parallel inverter via commands received from a utility.

30. The power system of claim 29 wherein the controller is connected to a utility to receive a commands from the utility.

31. A method of controlling power through a grid parallel inverter in a power system in which a grid supplies electrical power to a load and in which backup power is provided from one of a generator and a dc storage device including a standalone inverter having an input and an output, the output connected to the load; a grid parallel inverter, having an input and an output, the output connected to the grid; and a dc bus electrically connected to the input of the standalone inverter and to the input of the grid parallel inverter comprising:

controlling the power through a grid parallel inverter to approximately match a setpoint power.

32. The method of claim 31 wherein the setpoint power is the difference of the capacity of the generator and the maximum load of the load.

33. The method of claim 31 wherein the setpoint power is the difference of the capacity of the generator and the actual load of the load.

34. The method of claim 31 further comprising monitoring the actual load of the load.

35. The method of claim 31 wherein the power setpoint is determined by a power factor setpoint.

* * * * *